Patented Apr. 4, 1950　　　　　　　　　　　　　　　　　　　　　　　　2,503,205

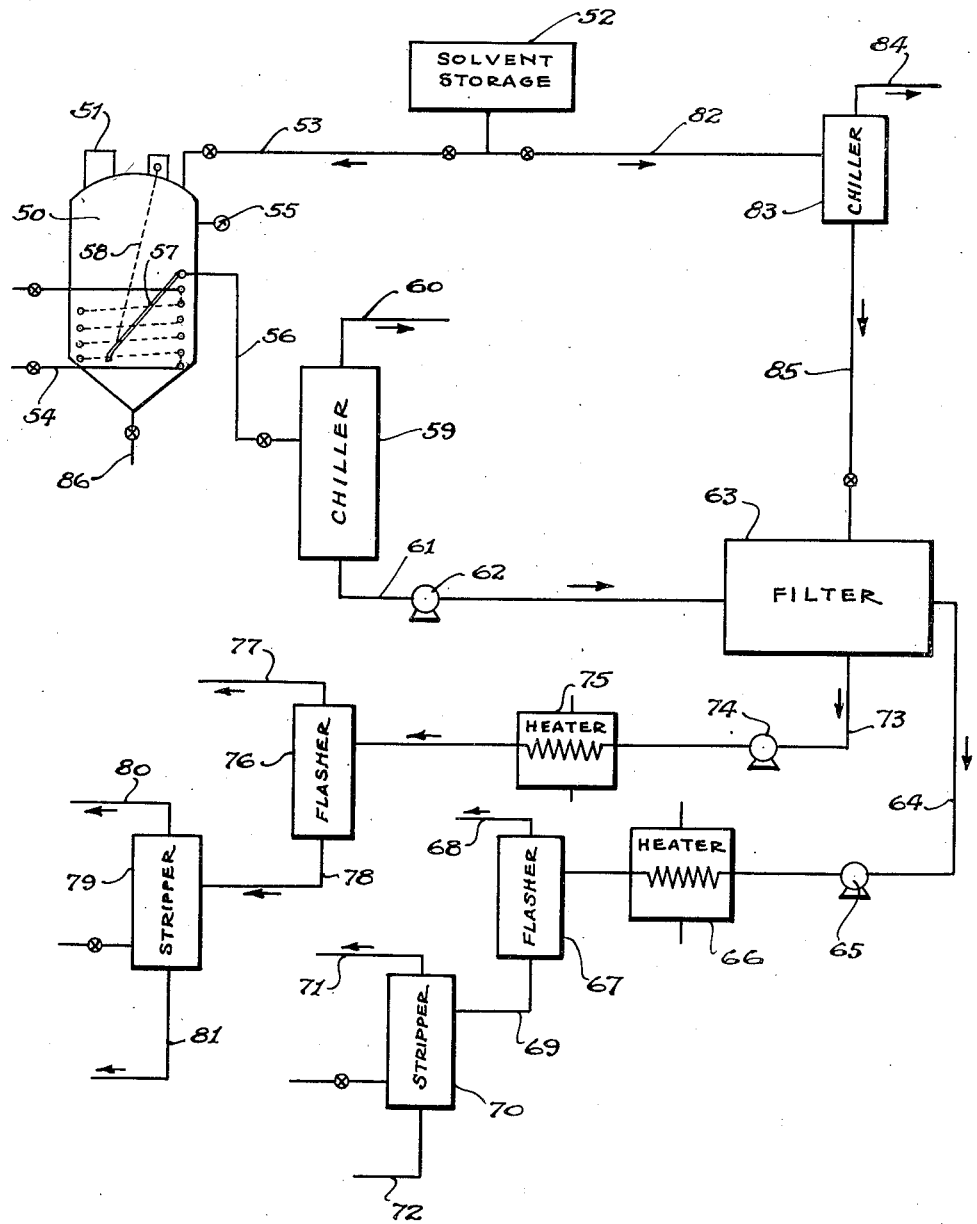

UNITED STATES PATENT OFFICE 2,503,205

RENDERING FAT

William M. Leaders, Chicago, Ill., assignor, by mesne assignments, to Swift & Company, a corporation of Illinois Application August 10, 1945, Serial No. 610,120

4 Claims. (Cl. 260—412.6)

This invention relates to the treatment of fatty materials, and has to do more particularly with an improved process for the rendering of fat from animal tissues.

It is common practice to separate fat from fat-bearing tissues by rendering. Heretofore, two types of rendering, namely, wet, or steam, rendering and dry rendering have been used. Wet rendering is accomplished by the use of steam in the presence of water applied to material to be rendered. In dry rendering the fatty material alone is subjected to a heat treatment. Both processes utilize the effects of heat in breaking down the cell structure, thus causing the fat globules to be released prior to their agglomeration.

The rendering operations practiced heretofore have been quite time-consuming and have involved a number of auxiliary treatments to remove the water, suspended solids and color bodies from the fat. Also, there has been considerable loss in the cracklings and the tankage. Moreover, the quality of the product particularly taste and odor are often impaired in the rendering operation.

An object of the present invention is to provide an improved rendering medium.

Another object of the present invention is the provision of a process whereby the length of time heretofore required to effect the separation of fat from fat-bearing animal tissue is considerably shortened.

A further object of the invention is to provide a process whereby a number of steps hitherto required in fat wet rendering are obviated.

Still another object of the present invention is the provision of a process whereby a more complete separation of fat from fat-bearing animal tissue is effected.

A still further object of the invention is the provision of a process whereby the fat recovered from fatty animal tissue is of improved quality and yield.

A further object of the invention is to produce a solid residue from rendering of enhanced value.

Other objects and advantages of the present invention will be apparent from the description of the invention hereinafter following.

Broadly, the invention contemplates mixing in a rendering tank a suitable organic solvent and fatty animal tissue from which fat is to be rendered, maintaining sufficient pressure in the rendering tank to keep the solvent in a liquid state and subjecting the mixture to temperatures below its critical point, but high enough to aid in the separation of the fat from fat-bearing tissue.

This rendering process is not to be confused with the ordinary process of solvent extraction of fats. Rendering is a wresting of fat from fat-bearing material; it is a process whereby a mechanical rupturing of the wall of the cell containing the fat occurs. By using an organic solvent, I utilize its solvent power for the fat after it has cooperated with heat and pressure in rendering the fatty animal tissue. After the fat has been caused to separate from the tissue, it dissolves in the solvent, and the resulting fat-solvent solution is treated in a continuous process whereby the fat in solution is separated into components by chilling and destearinizing. After the aforesaid fat-solvent solution leaves the rendering tank, the remaining fat-free proteinaceous material is withdrawn from the rendering tank and the solvent removed therefrom.

Solvents which are suitable as rendering media in the present invention are the hydrocarbons, such as ethane, propane, butane, together with the isomers and unsaturated forms of these, up to and including decane. A mixture of any of these may also be satisfactorily used.

In case it is desired to obtain a high quality fat free from any objectionable color, a normally gaseous hydrocarbon, such as propane, is preferably used. By the use of a normally gaseous hydrocarbon as the rendering medium, it is possible to effect a simultaneous decolorization along with the rendering.

In order to obtain simultaneous decolorization of the fat during rendering, the temperature of the solvent must be maintained around its critical point but above a certain minimum temperature below which the particular solvent would dissolve both the fat and the coloring matter. Sufficient pressure is exerted on the solvent to keep it in liquid phase. In the case of propane the minimum temperature at which decolorization occurs is around 150° F., but a more efficient decolorization is obtained between 160 to 190° F., and I prefer to use temperatures within the latter range. A temperature of around 175° F. has been found satisfactory. The pressure must be sufficient to maintain the solvent in the liquid phase and at the temperatures mentioned is preferably between 400 to 550 pounds per square inch. At the preferred temperature of around 175° F., I prefer to use a pressure of about 500 pounds per square inch.

In no case in the practice of my invention do I anticipate going beyond the critical temperature and critical pressure of any solvent which might be used. The critical conditions for the solvents hereinbefore listed can be readily obtained from the International Critical Tables.

In order to illustrate how the invention may be practiced, reference is made to the accompanying drawing.

The apparatus shown in diagrammatic form in the drawing is employed in a rendering process making use of solvents normally gaseous at room temperature. The fat is introduced into rendering vessel 50 through manhole 51 and 2 to 5 parts of solvent to 1 part by weight of fat from storage tank 52 are introduced into the rendering vessel through line 53. The vessel is heated with steam by coil 54, pressure in the vessel being recorded on gauge 55. After the rendering process is complete the fat-solvent solution is withdrawn through line 56 to an expander 59, wherein a portion of the solvent is vaporized through line 60 to reduce the temperature of the oil-solvent solution. The line 56 is connected to swinging arm 57, which may be raised or lowered to be above the solid matter collected at bottom of rendering tank, by means of an adjusting chain 58. The chilled solution is withdrawn through line 61 and forced by pump 62 to a filter 63 wherein a separation of the solid and liquid components is accomplished. The liquid portion is withdrawn from the filter through line 64 and forced by pump 65 through heater 66 to flasher 67 wherein a major portion of the solvent is removed through line 68. The fat fraction is conducted through line 69 to a steam stripper 70, the vapors from which are withdrawn by line 71. The finished destearinized oil is taken to storage through line 72. The crystallized fat fraction separated in the filter 63 is conducted through line 73 and forced by pump 74 through heater 75 to flasher 76, wherein a majority of solvent is vaporized and withdrawn through line 77. The oil is withdrawn from flasher 76 through line 78 to a steam stripper 79 wherein the final solvent is removed through line 80. The finished product is withdrawn through line 81 to storage. Filter 63 is equipped with a washing system, whereby solvent from storage tank 52 is conducted through line 82 to a chilling chamber 83 wherein a portion of the solvent is vaporized through line 84 to reduce the temperature. The chilled solvent is then introduced into the filter through line 85. Tankage from rendering tank is withdrawn through line 86 and treated by ordinary methods to rid it of solvent.

The following is an example of practicing the invention when a solvent normally gaseous, such as propane, is employed:

Seven thousand pounds of condemned hogs and parts thereof were loaded into a rendering tank and the tank sealed. Liquid propane at a temperature of around 80° F. and 150 pounds pressure per square inch was introduced into the rendering tank until 10 volumes of propane per volume of fatty tissue was obtained. This amounts to approximately 5 parts by weight of propane to 1 part by weight of material to be rendered. Steam was then applied to the coils of the rendering vessel and the temperature of the mixture slowly raised to around 180° F. and a pressure of about 490 pounds per square inch. These conditions were maintained for approximately 5 hours at which time the propane fat solution was withdrawn to a flashing chamber wherein part of the solvent was vaporized to reduce the temperature to around 0° F. and the propane ratio to about 5 to 1 by volume. The chilled material, containing crystals of the more saturated triglycerides present, was pumped to a continuous rotary drum pressure type filter wherein a separation of the crystalline material from the solution was obtained. The filtrate and precipitate were subjected separately to solvent recovery which included flashing and steam stripping for thorough removing of the solvent. An 83.6 per cent yield of inedible lard oil, maximum pour point 40° F., and 16.4 per cent of white grease, stearine of titer 48.2° C., were obtained. The color of these materials was not darker than 3 FAC (Fat Analysis Committee). This color was accomplished by operating the rendering tank at a temperature and pressure where coloring material normally present in rendered fat was insoluble in the solvent used.

In practicing this invention with a solvent normally gaseous at room temperature, it must be borne in mind that temperature and pressure conditions must be maintained in accordance with the critical conditions of the solvent in order to have a liquid phase to dissolve the fat which is liberated from the tissues being processed. In the case of propane the critical temperature is approximately 206° F. and the critical pressure 617 pounds per square inch.

An advantage of solvent rendering is a more efficient separation of the fat from fatty materials than has been hitherto possible. In solvent rendering a more thorough separation of fat from fat-bearing material occurs. Also solvent rendering effects the separation of fat from the fatty material in a shorter time by obviating the settling stages necessary in wet rendering, and consequently prevents losses attendant upon these steps in the ordinary method of fat rendering. Furthermore, in solvent rendering the fat may be simultaneously decolorized, if so desired. Moreover the protein after the solvent rendering operation is in a practically anhydrous form and more valuable.

Obviously many modifications and variations of the invention, as hereinbefore set forth, may be made without departing from the spirit and scope thereof, and therefore, only such limitations should be imposed as are indicated in the appended claims.

I claim:

1. In the process of rendering fats from fatty animal tissue, the step which comprises subjecting the fatty tissue to a temperature of about 180° F. for a period of about 5 hours in the presence of liquefied propane in an amount corresponding to a ratio by volume of about 10 parts propane to 1 part fatty tissue and maintaining the solvent in the liquid phase whereby color bodies are rejected by the solvent and the solubilized fat is decolorized during the rendering operation.

2. In the process of rendering fats from fatty animal tissue, the step which comprises: subjecting fatty animal tissue to a temperature between approximately 160° F. and 190° F. in the presence of a large proportion of a liquified normally gaseous hydrocarbon solvent to render the fat from the said tissue and maintaining the said solvent in the liquid phase whereby color bodies are rejected by the said solvent and the fat is simultaneously rendered and decolorized.

3. In the process of rendering fats from fatty animal tissue, the step which comprises: subjecting fatty animal tissue to a rendering treatment in the presence of a large proportion of a liquefied normally gaseous hydrocarbon solvent at a temperature above about 150° F. and below the critical temperature of the said solvent to render the fat from the said tissue while maintaining the said solvent in the liquid phase whereby color bodies are rejected by the said solvent and the fat is simultaneously rendered and decolorized.

4. The process of rendering fats from fatty animal tissue which comprises: subjecting fatty animal tissue to a rendering treatment in the presence of a large proportion of a liquefied normally gaseous aliphatic hydrocarbon solvent at a rendering temperature of at least about 150° F. and below the critical temperature of the said solvent while maintaining said solvent in the liquid phase whereby the fat free of undesirable impurities is rendered from the said tissue and forms a fat solution, separating the rendered tissue from the fat solution, and recovering the fat from the said solvent.

WILLIAM M. LEADERS.

REFERENCES CITED

The following references are of record in the file of this patent:

UNITED STATES PATENTS

| Number | Name | Date |
|---|---|---|
| 281,040 | Evans | July 10, 1883 |
| 1,372,479 | Bredlik et al. | Mar. 22, 1921 |
| 2,118,454 | Schaafsma | May 24, 1938 |
| 2,152,667 | Rosenthal | Apr. 4, 1939 |
| 2,291,461 | Freeman | July 28, 1942 |

FOREIGN PATENTS

| Number | Country | Date |
|---|---|---|
| 19,727 | Great Britain | Feb. 21, 1907 |
| 269,985 | Great Britain | Apr. 29, 1927 |
| 336,273 | Great Britain | Oct. 10, 1930 |